United States Patent
Taylor

[15] 3,655,155
[45] Apr. 11, 1972

[54] FISHING ROD MOUNT

[72] Inventor: John R. Taylor, 9503 Rivera Road, Pico-Rivera, Calif. 90660

[22] Filed: May 18, 1970

[21] Appl. No.: 38,377

[52] U.S. Cl.....................248/38, 43/21.2, 254/131
[51] Int. Cl.............................................A01r 97/10
[58] Field of Search................248/1, 38, 39, 40, 41, 42, 248/44, 359, 360; 43/21.2; 254/1, 131

[56] References Cited

UNITED STATES PATENTS

| | | | |
|---|---|---|---|
| 2,176,352 | 10/1939 | McHuron | 248/156 X |
| 2,314,747 | 3/1943 | White | 248/42 X |
| 2,917,258 | 12/1959 | Furey | 248/40 |
| 2,546,280 | 3/1951 | Stein | 248/42 |
| 3,484,066 | 12/1969 | Aunspaugh | 248/41 |

Primary Examiner—William H. Schultz
Attorney—Wm. Jacquet Gribble

[57] ABSTRACT

A fishing rod holder has a rocket base with a planar bottom and a curving depending lip adapted to rock on the ship or pier rail or other static rest. Adjustable support arms at the front and rear of the base have free ends whose longitudinal spacing is adjustable. Each support has a rod gripping clamp to grip the rod in the region of the line reel, the rear clamp preferably being a saddle adapted to receive screws from the reel base mount. The span from saddle to saddle is preferably less than the length of the reel mount section of the rod.

8 Claims, 6 Drawing Figures

Patented April 11, 1972  3,655,155

INVENTOR.
JOHN R. TAYLOR
BY
W.J. Gribble
ATTORNEY

FISHING ROD MOUNT

BACKGROUND OF THE INVENTION

The rod holder of the invention is for fishing rods, more particularly for use by fishermen using rods for deep-water fishing needing considerable effort for each increment of line taken up on the reel. The rods utilized in deep-sea fishing normally comprise a substantial handle portion of 18 inches to 24 inches, which may include the reel mount section, which is considerably more rigid than the flexible rod segment carrying the reel line guides. The fishermen reels in his catch by alternately elevating and quickly lowering the outward end of his rod to achieve line slack which is quickly cranked up on the reel. When the attached fish is of any weight and the amount of line paid out is on the order of 100 to 300 feet, the alternate raising and lowering of the rod tip places a great muscular strain on the fisherman.

Several previous devices have taken advantage of the level arm afforded by the extension of the rod handle behind the reel. However, many such devices require clamping or otherwise securing the device not only to the rod but to a railing or other static rest. Additionally, the means for attachment of previous rod holders has resulted in the breakage of the rod either due to the fact that only one support position is afforded, or due to the fact that incorrect fastening of the rod to the holder has concentrated stresses at a weak point in the rod structure.

SUMMARY OF THE INVENTION

The invention contemplates a fishing rod leverage device which attaches to a fishing rod having a reel mount section and a reel. The device comprises a rocker base, a curving rearward lip on the base, and front and rear supports extending from the base and adapted to receive the rod. One or more of the supports has means for longitudinal adjustment with respect to the other support. Each support has means for securing the rod to the device adjacent the line reel on the rod.

Preferably the attachment means on each support comprises a saddle with a U-shaped clamp member to span the rod and fasten to the saddle. The supports may be pivotally secured to the rocker base such that the free ends of the supports are adjustable with respect to each other along the length of the rod.

The apparatus of the invention accomplishes the objectives of affording a pole leverage device operable without attachment to a support, such as a rail, which utilizes the lever arm of the rod handle in its extension beyond the reel mount, and which attaches quickly and easily to the strongest part of the fishing rod. The inventive apparatus also accomplishes the objectives of affording a device which is simple to attach and which may be adjusted to accommodate rods and poles of varying reel mount characteristics.

These and other advantages of the invention are apparent from the following detailed description and drawing, in which like parts are given like numerals.

DESCRIPTION OF THE PREFERRED EMBODIMENTS

Figure 1:
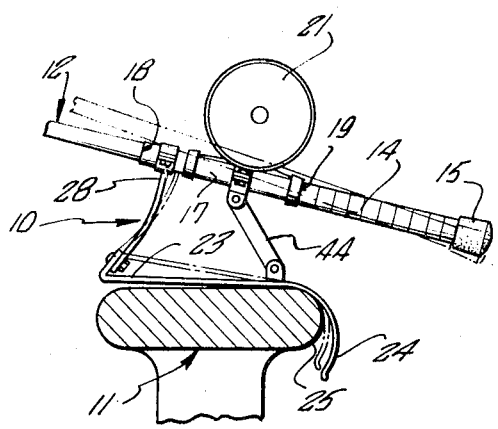
FIG. 1 is an elevational view showing the rod holder of the invention resting on a rail and supporting a fragmentarily shown fishing rod.

In FIG. 1 a fishing rod holder 10 rests upon a fragmentarily illustrated rail 11, such as the railing of a commercial fishing boat, and supports a schematically represented fishing rod 12 of the breakdown type.

The rod has a handle 14 with a resilient butt 15. The handle includes a reel mount section 17 between the joint lines 18 and 19. A reel 21 is fixed to the reel mount section of the rod.

Figure 2:
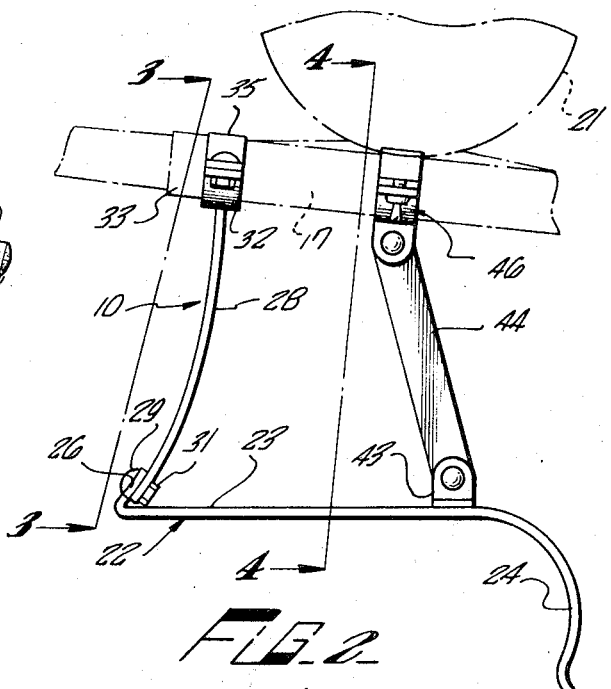
FIG. 2 is a side elevation to a larger scale of the device of FIG. 1.

The rod holder 10, as can be seen more clearly in FIG. 2, has a rocker base 22 comprised of a planar base portion 23 and a depending curving lip 24 which is tangent to the inward edge 25 of the rail in FIG. 1. The base portion and lip are about 6 inches long. The rocker base terminates forwardly or in the outboard direction in an angularly upturned flange 26 to which a forward rod support 28 is secured by convenient means, such as a screw 29 and a nut 31.

Figure 3:
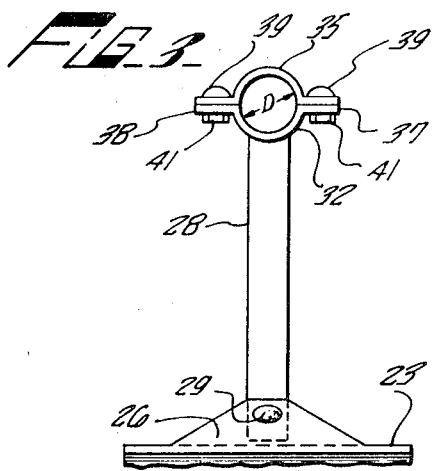
FIG. 3 is a fragmentary section taken along line 3—3 of FIG. 2.

As can be seen in FIG. 3, the rod front support 28 terminates at its upward end in a saddle piece 32 in which a forward portion 33 of the reel mount section of the rod is seated, about 3 inches above the rocker base. An inverted U-shaped clamping member 35 is secured about the rod and to the extending transverse flanges 37, 38 of the saddle piece 32 by conventional screws 39 and nuts 41. The joined saddle and member encompass about a 1 inch diameter.

Turning again to FIG. 2, a pivot bracket 43 on the base pivotally supports a rod rear support 44 which terminates at its upper end in a pivotally mounted split saddle 46. The saddle has similar right and left halves 47, 48, each comprising an arcuate saddle portion 51 and an outward flange 52.

Figure 4:
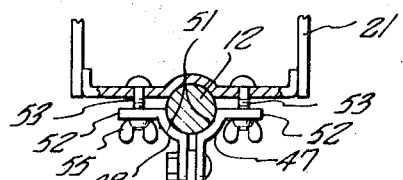
FIG. 4 is a fragmentary section taken along line 4—4 of FIG. 2.

In some instances a clamping member, such as the member 35 of the front support, may be attached to the split saddle of FIG. 4 about the reel mount section of the rod. However, as in the illustrative embodiment, the mounting screws 53 from the reel 21 may extend through the split saddle flanges to be secured by nuts, such as the wing nuts 55.

There are several reels having mounting hardware adapted to link with the split saddle of FIG. 4. One such reel is the Penn "Senator 6.0" deep-sea reel which may have depending mounting screws which can extend through the saddle of FIG. 4.

In the illustrative embodiment of FIG. 1 the beam depths of the front and rear supports are oppositely oriented with respect to the longitudinal line of the rod. The term "beam depth" defines functionally the width of the support as opposed to its thickness. The supports are thereby arranged to resist both transverse and lateral stresses in simple fashion.

The rear support pivots at both top and bottom such that the spacing of the end remote from the rocker base may be adjusted with respect to the saddle of the front support to accommodate the support device to various rods without misalignment of the clamping members. Normally the center to center longitudinal spacing of front and rear saddles is about 2½ inches, varying with the rod type. It is desired that the support saddles contact the rod in the area of the reel mount, since conventional rods are strongest in this area. Some previous rod holders have failed because the support concentrated stresses at a point in advance of the reel mount section and the rods consequently snapped at this point under the strain of the rocking motion used by the fisherman to lift the load from the depths.

A unitary saddle may be utilized for the rear support as well as the front. However, the split saddle is preferred to simplify manufacturing techniques by eliminating welding at the outer end of the rear support.

Figure 5:
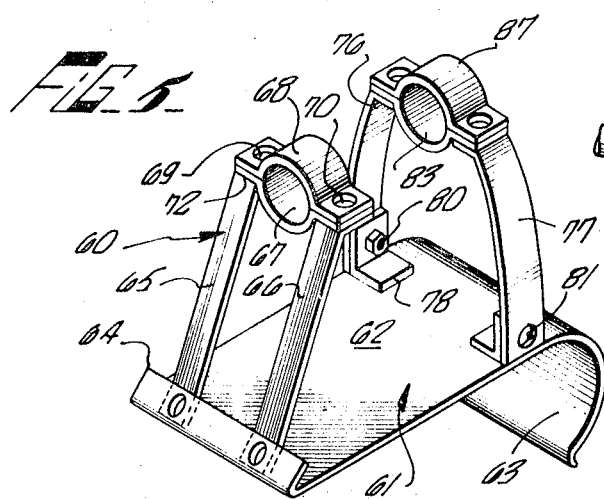
FIG. 5 is a perspective view of an alternate embodiment of the invention.

In the FIG. 5 alternate embodiment of the invention a holder 60 utilizes twin support members each of the front and rear supports. A rocker base 61 has a planar horizontal section 62 and a downwardly depending curved lip 63 which combine to support the rod holder on a static horizontal member, as shown in FIG. 1. The rocker base 61 has a forward or outboard flange 64 extending from the planar base. Parallel support members 65, 66 are fastened to the lip and extend upwardly to a saddle 67. A U-shaped clamp 68 is fixed by screws 69, 70 to the saddle flanges 72, 73.

A pair of rear support members 76, 77 are pivotally fixed to angle brackets 78, 79 secured to the rocker base. Screws 80, 81 extend through the supports and the brackets such that the rear supports may pivot on a transverse line to adjust the distance between the saddle 67 of the front bracket and a flanged saddle 83 of the rear bracket. Like the forward supports, the rear saddle receives an inverted U-shaped clamp 87 which may be secured about the rod resting in the saddle. As previously described, some reels may provide mounting screws to be secured directly to the saddle flanges.

The embodiment of FIG. 5 also has front and rear supports oppositely oriented as to the beam depth of the support members.

In use it is similar to the embodiment of FIG. 1, being freely placed upon a support rail or other horizontal static member and rocked by manipulation of the rod handle 14 to achieve the line slack necessary to reel in the fish. The device has found particular utility for those who have physical handicaps since it provides a simple, freely movable support such that one hand may be used to enjoy the advantage of the lever arm length of the rod handle obviating the necessity for the fisherman to lift the rod, line and fish each time he achieves line slack for the purpose of reeling in line.

Figure 6:
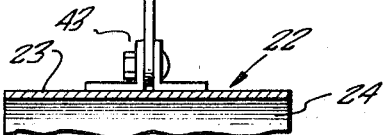
FIG. 6 is a fragmentary elevational view of a further alternate embodiment of the invention.

In the alternate embodiment of FIG. 6 a rod support 90 supports a unitary rod 92 with a reel mount section 17 and a forward hand grip 94, both conventional. The reel itself is not shown. Rod 92 is not a breakdown type, but may have a removable handle, shown fragmentarily at 16.

Support 90 has a rocker base 23, which has a planar section and a curving lip about four inches wide, like the previously described embodiments. The rocker base also has a front transverse flange 26, and a pivot bracket 43 extending from the base. A support 44 is pivotally secured at one end to the bracket and has a split saddle 46 pivotally secured to its other end, with a U-shaped clamp member 35 holding the reel mount section of the rod in the saddle. The reel may be conventionally secured in place over the member 35 or, if of the proper type, directly secured to the saddle with reel mount screws like screws 53 of FIG. 2.

A forward rod support 95 is conveniently fixed to flange 26 and extends from the rocker base to curve forwardly in a cup saddle 96, adapted to cradle the hand grip 94 of the straight rod near its juncture with the reel mount section. A metallic band 97, like those used for hose and tubing clamps, passes through slits like slit 98 on each side of the cup saddle and the ends are joined in adjustable fashion by a worm 101. The attitude of the one-piece rod can be altered, as can the support spacing, by tilting support 44.

Each embodiment of the invention is simple to fabricate, easy to assemble and uncomplicated in operation. The device may be moved quickly from point to point at the whim of the fisherman and different rods can be secured easily in the saddles as desired.

Other variations within the scope of the invention than those shown will occur to those skilled in this field. Therefore, it is desired that the invention be measured by the appended claims, rather than by the purely illustrative embodiments disclosed herein.

I claim:

1. A fishing rod leverage mount for attachment to a rod having a reel mount section and a reel, the device comprising a rocker base adapted to rock upon a static rest and having a flat rest portion and a curving rocking lip portion, a rod front support extending from the base, a rod rear support extending from the base, at least one of said supports having means for longitudinal adjustment with respect to the base, and attachment means on each support for securing a rod thereto adjacent the rod reel.

2. A device in accordance with claim 1 wherein the attachment means on the rear support comprises a saddle, oppositely extending flanges on the saddle, and screw means for securing the reel to the flanges.

3. A device in accordance with claim 1 wherein the attachment means for each support comprises a saddle on which the pole rests, a curving clamp member adapted to curve about that portion of the pole adjacent the reel, and means for securing the clamp member to the saddle.

4. A rod mount in accordance with claim 1 wherein the longitudinal adjustment means comprises a bracket secured to the base, a pivot through the bracket and the support, and pivot means securing the attachment means to the other end of the support from the bracket.

5. A rod mount in accordance with claim 1 wherein the greatest beam depth of one rod support is oppositely oriented with respect to the greatest beam depth of the other rod support.

6. A rod mount in accordance with claim 1 wherein the rod front support comprises a vertical support member with a forwardly extending end on the member, and the attachment means comprises a saddle, transversely opposed slots on each side of the saddle, and an adjustable tension band passing through both slots so as to surround a rod portion resting in the saddle.

7. A rod mount in accordance with claim 1 wherein the rod front support comprises a pair of vertical members and the rod rear support comprises a pair of vertical members, one pair of said supports being pivotally secured to the rocker base such that the space between the ends of the supports remote from the base may be varied.

8. A rod mount in accordance with claim 7 wherein the attachment means for each support comprises a saddle on which the pole rests, a curving clamp member adapted to curve about that portion of the pole adjacent the reel, and means for securing the clamp member to the saddle.

* * * * *